United States Patent
Ellis et al.

(10) Patent No.: US 10,746,351 B1
(45) Date of Patent: Aug. 18, 2020

(54) STRAP ASSEMBLY, SYSTEM, AND METHOD FOR HEAD-MOUNTED DISPLAYS

(71) Applicant: FACEBOOK TECHNOLOGIES, LLC, Menlo Park, CA (US)

(72) Inventors: Shane Michael Ellis, Bellevue, WA (US); Lesley Ribble Magrath, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 373 days.

(21) Appl. No.: 15/495,757

(22) Filed: Apr. 24, 2017

(51) Int. Cl.
| | |
|---|---|
| *F16M 13/04* | (2006.01) |
| *B29C 65/02* | (2006.01) |
| *G02B 27/01* | (2006.01) |
| *B29L 31/00* | (2006.01) |
| *B29L 31/34* | (2006.01) |

(52) U.S. Cl.
CPC ............ *F16M 13/04* (2013.01); *B29C 65/02* (2013.01); *G02B 27/0176* (2013.01); *B29L 2031/3462* (2013.01); *B29L 2031/7276* (2013.01)

(58) Field of Classification Search
CPC .............. G02B 27/017; G02B 27/0176; G02B 27/0178; G02B 27/01; G02B 23/125; G02B 2027/0178; G06F 3/011; G06F 3/012; G06F 3/013; G06F 1/163; G06F 1/1637; F16M 13/04; F16M 13/00; F16M 11/02; H04N 13/332; H04N 13/344; A42B 1/24; G06T 19/006; A45F 5/00
USPC .................................................. 224/182, 181
See application file for complete search history.

(56) References Cited

U.S. PATENT DOCUMENTS

| | | | |
|---|---|---|---|
| 2003/0115661 A1* | 6/2003 | Dobbie ................. | A42B 1/046 2/422 |
| 2009/0307828 A1* | 12/2009 | Ludlow ................. | A61F 9/029 2/431 |
| 2015/0185478 A1* | 7/2015 | Sato ..................... | G02B 27/017 345/8 |
| 2017/0038797 A1* | 2/2017 | Ohsawa ................ | G06F 1/163 |

(Continued)

OTHER PUBLICATIONS

3231 Soft Goods Product Data Sheet; https://wenku.baidu.com/view/a5270d9bdc88d0d233d4b14e852458fb770b388a.html?re=view; as accessed Jun. 20, 2017 (dated Sep. 19, 2013).

*Primary Examiner* — Nitin Patel
*Assistant Examiner* — Amen Woldesenbet Bogale
(74) *Attorney, Agent, or Firm* — FisherBroyles, LLP

(57) ABSTRACT

A head-mounted-display strap assembly may include a flexible lining member having (1) a head-contact layer positioned to abut a head portion of a user, (2) a mounting layer overlapping the head-contact layer, the mounting layer defining a wiring channel, and (3) a mesh layer disposed between the head-contact layer and the mounting layer such that a portion of the mesh layer overlaps the wiring channel. A method may include (1) attaching a head-contact layer for a head-mounted-display strap assembly to a mesh layer and (2) attaching a mounting layer to the mesh layer such that the mesh layer is disposed between the head-contact layer and the mounting layer the mounting layer defining a wiring channel, and a portion of the mesh layer overlapping the wiring channel. Various other head-mounted-display strap assemblies, head-mounted-display systems, and methods are also disclosed.

20 Claims, 6 Drawing Sheets

(56) References Cited

U.S. PATENT DOCUMENTS

2018/0095497 A1* 4/2018 Hsu .................. A42B 3/085
2018/0103917 A1* 4/2018 Kim .................. A61B 5/0478

* cited by examiner

STRAP ASSEMBLY, SYSTEM, AND METHOD FOR HEAD-MOUNTED DISPLAYS

BACKGROUND

Virtual reality head-mounted displays have wide applications in various fields, including engineering design, medical surgery practice, military simulated practice, and video gaming. For example, virtual reality head-mounted displays may allow users to experience realistic, immersive virtual environments while playing video games, during flight simulation training, or when interacting with co-workers around the globe.

Head-mounted display systems often include strap assemblies that enable users to comfortably position and hold the virtual reality head-mounted displays on their heads. Circuitry may be included in the strap assemblies to electrically connect the virtual reality head-mounted displays to components, such as light-emitting diodes (LEDs) disposed in back pieces connected to the strap assemblies. A conventional strap assembly may include an internal channel to accommodate wiring. Unfortunately, such an internal channel may form an aesthetically unpleasing depression on an exterior portion of the strap assembly. The internal channel may also compromise the strength and durability of the assembly.

SUMMARY

As will be described in greater detail below, the instant disclosure generally relates to head-mounted-display strap assemblies, head-mounted-display systems, and methods for manufacturing such assemblies and systems. In some embodiments, a head-mounted-display strap assembly may include a flexible lining member having (1) a head-contact layer positioned to abut a head portion of a user, (2) a mounting layer overlapping the head-contact layer, the mounting layer defining a wiring channel, and (3) a mesh layer disposed between the head-contact layer and the mounting layer such that a portion of the mesh layer overlaps the wiring channel.

In some examples, the assembly may further include an electronic cable at least partially disposed within the wiring channel defined by the mounting layer. Additionally, the assembly may include a backing member having a mounting surface and the mounting layer of the flexible lining member may be disposed adjacent to the mounting surface of the backing member. In this example, at least a portion of the electronic cable may be positioned between the mesh layer and the backing member. The mounting layer of the flexible lining member may also be attached to the mounting surface of the backing member. In at least one example, a mounting recess may be defined within the backing member, with a portion of the mounting recess being defined by the mounting surface. In this example, at least a portion of the flexible lining member may be disposed within the mounting recess.

According to some embodiments, the mounting layer may include a thermoplastic polymer that is bonded to the mesh layer. In this example, at least a portion of the thermoplastic polymer may be disposed within a plurality of holes defined in the mesh layer. The mesh layer may include a polymeric mesh fabric. In some examples, the flexible lining member may define an opening extending through the head-contact layer, the mounting layer, and the mesh layer. In this example, the mesh layer may define a plurality of slits surrounding the opening. In one example, the portion of the mesh layer overlapping the wiring channel defined by the mounting layer may directly abut the wiring channel.

A corresponding head-mounted-display system may include a head-mounted display and a strap assembly coupled to the head-mounted display. The strap assembly may include a backing member and a flexible lining member mounted to the backing member. The flexible lining member may include (1) a head-contact layer positioned to abut a head portion of a user, (2) a mounting layer overlapping the head-contact layer, the mounting layer defining a wiring channel, and (3) a mesh layer disposed between the head-contact layer and the mounting layer such that a portion of the mesh layer overlaps the wiring channel. The system may also include an electronic cable at least partially disposed within the wiring channel defined by the mounting layer such that at least a portion of the electronic cable is positioned between the mesh layer and the backing member.

In one example the strap assembly may include a back piece defining an opening extending through the backing member and the flexible lining member. According to some embodiments, the mounting layer may include a thermoplastic polymer that is bonded to the mesh layer and to a mounting surface of the backing member. The mesh layer may include a polymeric mesh fabric.

In one embodiment, a method may include (1) attaching a head-contact layer for a head-mounted-display strap assembly to a mesh layer and (2) attaching a mounting layer to the mesh layer such that the mesh layer is disposed between the head-contact layer and the mounting layer. The mounting layer may define a wiring channel and a portion of the mesh layer may overlap the wiring channel.

In one example, the mounting layer may include a thermoplastic polymer and attaching the mounting layer to the mesh layer may include heating the mounting layer to a temperature sufficient to bond the thermoplastic polymer to the mesh layer. The method may also include positioning at least a portion of an electronic cable within the wiring channel. In this example, the method may additionally include attaching the mounting layer to a backing member such that at least the portion of the electronic cable is positioned between the mesh layer and the backing member. In some examples, the mounting layer may include a thermoplastic polymer and attaching the mounting layer to the backing member may include heating the mounting layer to a temperature sufficient to bond the thermoplastic polymer to a mounting surface of the backing member. In some embodiments, attaching the head-contact layer to the mesh layer may include bonding the head-contact layer to the mesh layer by a bonding layer disposed between the head-contact layer and the mesh layer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

Figure 1:
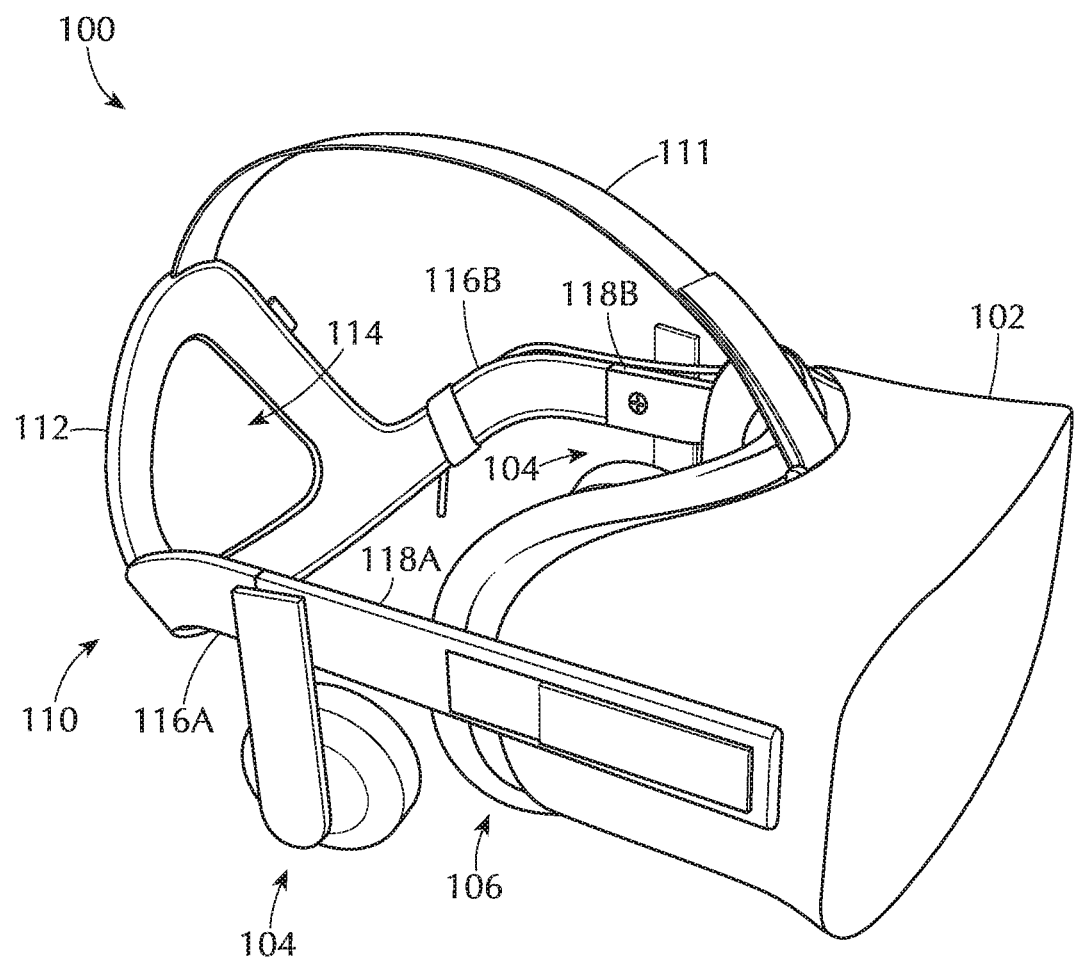
FIG. 1 is a perspective view of an exemplary head-mounted-display system.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary strap assemblies for head-mounted-display systems and methods for manufacturing such assemblies. A strap assembly may include a flexible lining member that includes multiple layers to comfortably fit a head-mounted-display system on a user's head. The flexible lining member may include a channel that securely houses an electronic cable on a side of the lining member that does not contact the user's head. The flexible lining member may also include a mesh layer that, in conjunction with other layers of the flexible lining member, strengthens the strap assembly and prevents a visible depression from forming on a side of the strap assembly facing the user. The flexible lining member may also be constructed in a manner that minimizes the overall thickness of the flexible lining member to decrease the weight and profile of the strap assembly. As discussed in greater detail below, these and other disclosed embodiments, whether used alone or in combination, may help optimize the immersiveness, enjoyability, and/or utility of a virtual- or augmented-reality experience.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-6, detailed descriptions of exemplary strap assemblies for head-mounted display systems. Detailed descriptions of corresponding methods for manufacturing facial-interface systems also be provided in connection with FIGS. 7 and 8A-8D.

FIG. 1 is a perspective view of a head-mounted-display system 100 in accordance with various embodiments. In some embodiments, head-mounted-display system 100 may include a head-mounted display 102, an audio subsystem 104, a facial interface system 106, and a strap assembly 110. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector a cathode ray tube, an optical mixer, etc. Head-mounted displays may also display content in one or more of various media formats. For example a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, audio subsystem 104 may be integrated with head-mounted display 102 and may provide audio signals to the user's ears. Head-mounted-display system 100 may, for example, have two audio subsystems 104 located on the left and right sides of head-mounted-display system 100 to provide audio signals to the user's left and right ears. In some embodiments, facial-interface system 106 may include a cushion that is dimensioned to comfortably rest against a region of the user's face, including a region surrounding the user's eyes when head-mounted-display system 100 is worn by the user.

In some embodiments, strap assembly 110 may be used for adjustably mounting head-mounted display 102 on the user's head. As shown in FIG. 1, strap assembly 110 may include an upper strap 111, a back piece 112, semi-rigid strap sections 116A and 116B, and rigid strap sections 118A and 118B that are coupled to head-mounted display 102 to adjustably and securely conform to the top and/or sides of the user's head when the user is wearing the head-mounted display. In some embodiments, back piece 112 may include a back-piece opening 114 and may be coupled with upper strap 111 and semi-rigid strap sections 116A and 116B to rest against the back of the user's head. Back-piece opening 114 may be dimensioned and positioned to securely fit around a back portion (e.g., a portion of the user's occipital lobe) of the user's head. For example, as shown in FIG. 1, back piece 112 and back-piece opening 114 may each have a generally triangular shape.

Semi-rigid strap section 116A and rigid strap section 118A may be positioned on a right side of the user's head and semi-rigid strap section 116B and rigid strap section 118B may be positioned on a left side of the user's head when head-mounted-display system 100 is worn by the user. Semi-rigid strap sections 116A and 116B may each include a continuous semi-rigid segment having two arc portions, with each arc portion being dimensioned to extend from above a user's ears to below the user's occipital lobe to conform to a portion of the user's head when head-mounted-display system 100 is worn by the user. Semi-rigid strap sections 116A and 116B may each be respectively connected to rigid strap sections 118A and 118B, which are also respectively coupled to head-mounted-display device 102. Strap assembly 110 may further include flexible segments (not shown) that are stretchable within rigid strap sections 118A and 118B respectively to adjust the strap assembly 110 in accordance with the user's head. Strap assembly 110 may additionally or alternatively include any other suitable adjustment mechanism for comfortably fitting and securing head-mounted-display system 100 to the user's head.

In some embodiments, various electrical connection components (e.g., flat flexible circuits and/or electrical cables, such as ribbon cables) may be housed within strap assembly 110 to provide power management, signal transmission, and/or other functionalities to head-mounted display 102, detachable audio subsystem 104, and/or components of strap assembly 110. For example, strap assembly 110 may include electronics, such as LED lights disposed in or on back piece 112 (not shown), that are used for motion tracking purposes to provide 360-degree motion control while using head-mounted-display system 100. Electrical connection mechanisms, including cables, may be disposed within strap assembly 110 to electrically connect such electronics to head-mounted display 102.

Figure 2:
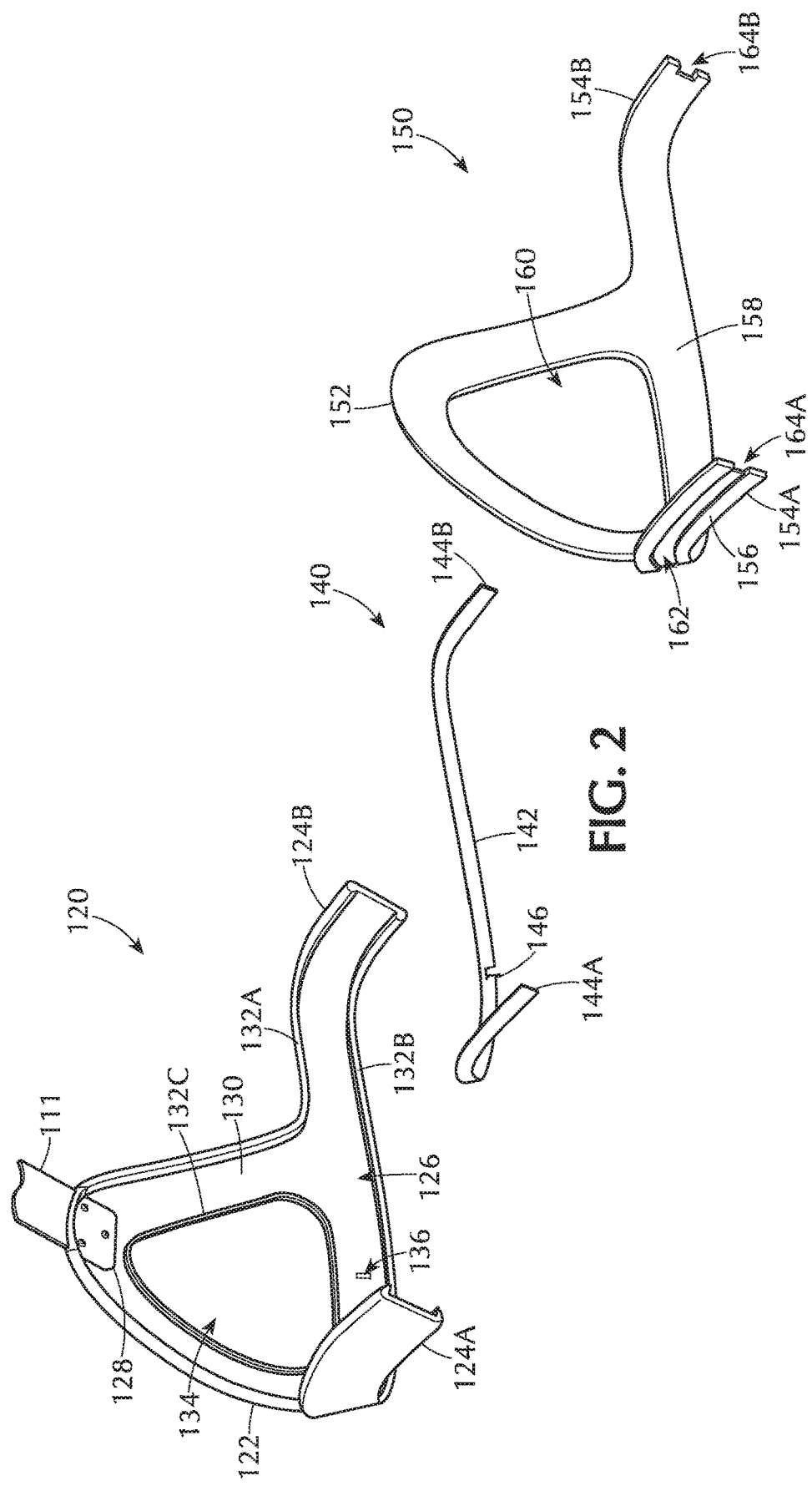
FIG. 2 is a perspective view of separated components of an exemplary head-mounted-display strap assembly.

FIG. 2 is a perspective view showing exemplary components of strap assembly 110 in accordance with some embodiments. As shown in FIG. 2, strap assembly 110 may include a backing member 120, an electronic cable 140, and a flexible lining member 150. In some embodiments, backing member 120, electronic cable 140, and flexible lining member 150 may include portions of back piece 112 and semi-rigid strap sections 116A and 116B shown in FIG. 1. In strap assembly 110, flexible lining member 150 may be attached to backing member 120, with electronic cable 140 disposed between flexible lining member 150 and backing member 120 such that electronic cable 140 is not be visible from the exterior and does not interfere with a user's experience while wearing head-mounted-display system 100.

Backing member 120 may include any suitable semi-rigid material (e.g., a polymer material composite material, metallic material, etc.) of any shape, size, and/or flexibility suitable for housing and/or mounting electronic components while permitting a desired degree of adjustable conformity to the shape of a user's head. Backing member 120 may be formed or manufactured as an integral piece or may include multiple segments coupled together in any suitable manner.

Backing member 120 may include a cradle portion 122 that forms a portion of back piece 112 of strap assembly 110 and that is configured to at least partially cradle and/or conform to a back portion of a user's head. Backing member 120 may also include strap portions 124A and 124B protruding from cradle portion 122 and respectively forming portions of semi-rigid strap sections 116A and 116B shown in FIG. 1. In some embodiments, backing member 120 may define a mounting recess 126 on a side configured to face the user's head for securely mounting and/or surrounding at least a portion of flexible lining member 150. Mounting recess 126 may be defined by a mounting surface 130 and one or more mounting rims, such as upper mounting rim 132A, lower mounting rim 132B, and inner mounting rim 132C. An opening 134 corresponding to back-piece opening 114 of strap assembly 110 may be defined by cradle portion 122 of backing member 120 that includes inner mounting rim 132C. Upper strap 111 may be coupled to backing member 120 in any suitable manner. For example, as shown in FIG. 2, upper strap 111 may be fastened to an upper portion of backing member 120 by an upper-strap connector 128.

In some embodiments, backing member 120 may include any suitable features, such through holes and/or recesses, for securing and/or providing passage for additional components (e.g., circuits, electrical cables, LED array assemblies, etc.), without limitation. For example, electrical wiring, such as electronic cable 140, running through at least a portion of strap assembly 110 may be connected to one or more components, such as an LED array mounted to backing member 120, via at least one through-hole and/or opening defined in any suitable portion of backing member 120, such as through-hole 136 illustrated in FIG. 2. Through-hole 136 may extend, for example, from a portion of mounting surface 130 to an internal region of backing member 120 and/or to an opposite side of backing member 120 facing away from a user's head. In some example, one or more additional through-holes, openings, and/or recesses may be defined in backing member 120.

Electronic cable 140 may include any type of electrical cable suitable for supplying signals and/or power between head-mounted-display device 102 and one or more electrical components. For example, electronic cable 140 may include a flat, flexible or semi-flexible cable, such as a ribbon cable, that is conformable to a surface region, such as a portion of mounting surface 130, of backing member 120. In at least one embodiment, electronic cable 140 may include a cable main portion 142 having multiple conducting wires running substantially parallel to each other along the length of electronic cable 140. Electronic cable 140 may additionally include cable ends 144A and 144B having any suitable connectors and/or terminal wire ends for electrically connecting electronic cable 140 to corresponding connectors and/or wiring, such as connectors housed within rigid strap sections 118A and 118B shown in FIG. 1. In some embodiments cable end 144A and/or cable end 144B may protrude from a corresponding end of strap portion 124A and/or strap portion 124B. In some embodiments, cable main portion 142 may include one or more connectors or terminal wire ends for electrically connecting electronic cable 140 to one or more components (e.g., an LED array) secured to backing member 120. For example, electronic cable 140 may include a connecting end 146 protruding from cable main portion 142 toward backing member 120 such that connecting end 146 is disposed within through-hole 136 defined in backing member 120 when strap assembly 110 is assembled. In some embodiments, strap assembly 110 may include multiple cables, such as multiple ribbon cables, disposed between backing member 120 and flexible lining member 150.

Flexible lining member 150 may be configured to abut and/or conform to back and/or side portions of a user's head. In some embodiments, flexible lining member 150 may include a flexible, semi-flexible, and/or semi-rigid material having multiple layers, including one or more fabric layers and/or adhesive layers, as will be described in greater detail below. Flexible lining member 150 may include a cradle portion 152 that forms a portion of back piece 112 of strap assembly 110 shown in FIG. 1 and that is configured to abut and/or conform to a back portion of a user's head. Flexible lining member 150 may also include strap portions 154A and 154B protruding from cradle portion 152 and respectively forming portions of semi-rigid strap sections 116A and 116B of strap assembly 110. Flexible lining member 150 may include a mounting surface 156 and a head-contact surface 158. Mounting surface 156 may be abut mounting surface 130 of backing member 120 in strap assembly 110. In some embodiments, mounting surface 156 of flexible lining member 150 may be directly or indirectly adhered to mounting surface 130 of backing member 120 and/or to another portion of backing member 120 (e.g., upper mounting rim 132A, lower mounting rim 132B, and/or inner mounting rim 132C). Additionally or alternatively, at least a portion of flexible lining member 150 may be coupled and/or secured to backing member 120 in any suitable manner, without limitation. Head-contact surface 158 of flexible lining member 150 may be configured to directly abut back and/or side portions of the user's head. An opening 160 corresponding to back-piece opening 114 of strap assembly 110 may be defined by cradle portion 152 portion of flexible lining member 150.

Flexible lining member 150 may define a wiring channel 162 adjacent to mounting surface 156 for housing at least a portion of electronic cable 140. In some embodiments, wiring channel 162 may extend at least partially along a lower portion of flexible lining member 150 from strap portion 154A to strap portion 154B. Wiring channel 162 may additionally or alternatively extend along any suitable portion of flexible lining member 150 (e.g., around at least a portion of opening 160), without limitation. Electronic cable 140 may be disposed within at least a portion of wiring channel 162 of flexible lining member 150 such that ribbon cable extends along and through wiring channel 162 when flexible lining member 150 is attached to backing member 120.

According to at least one embodiment, an end notch 164A and/or an end notch 164B may be respectively defined in strap portion 154A and/or strap portion 154B of flexible lining member 150. End notches 164A and 164B may extend through respective end regions of strap portion 154A and strap portion 154B from mounting surface 156 to head-contact surface 158. In some embodiments, wiring channel 162 may terminate at end notch 164A and/or end notch 164B. In one embodiment, end notch 164A and/or end notch 164B may have substantially the same width as adjacent portions of wiring channel 162. End notch 164A and/or end notch 164B may accommodate terminal end portions of electronic cable 140 (e.g., connectors, terminal wire ends, etc.) and/or may allow for redirection of electronic cable 140 from wiring channel 162 to facilitate connection of electronic cable 140 to electrical circuitry and/or components within corresponding rigid strap sections 118A and/or 118B of strap assembly 110 shown in FIG. 1. In some embodiments, as will be described and shown in greater detail below, flexible lining member 150 may also include at least one adhesive transfer element having an adhesive layer disposed on at least a portion of mounting surface 156, such as surface regions of strap portion 154A and/or strap portion 154B respectively adjacent to end notch 164A and/or end notch 164B. The at least one adhesive transfer element may cover at least a portion of wiring channel 162 adjacent to end notch 164A and/or end notch 164B and may facilitate positioning and/or securement of electronic cable 140 during manufacturing of strap assembly 110.

Figure 3:
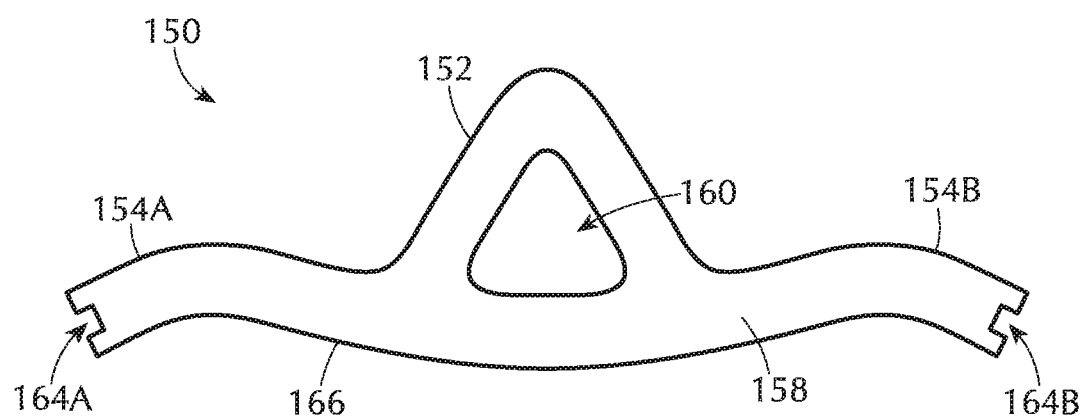
FIG. 3 is a front side view of an exemplary flexible lining member for a head-mounted-display strap assembly.
Figure 4:
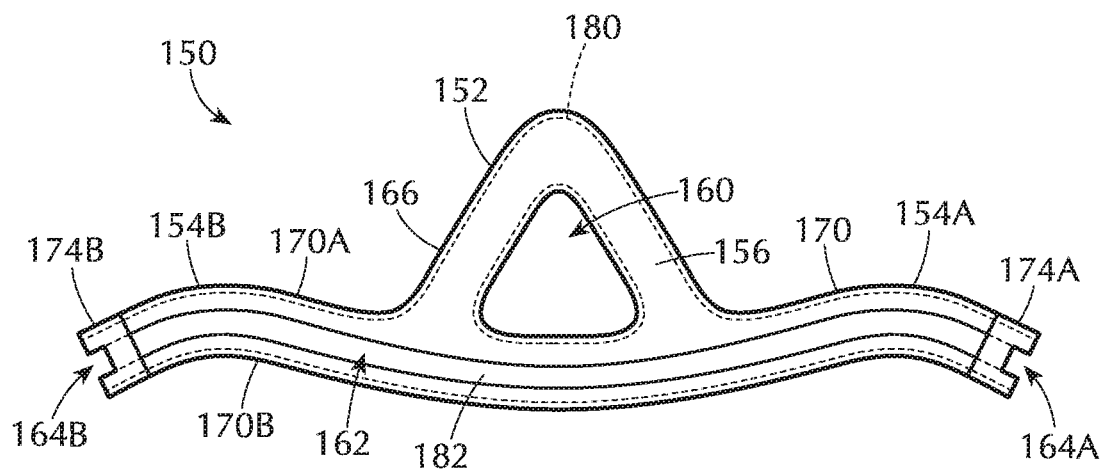
FIG. 4 is a back side view of an exemplary flexible lining member for a head-mounted-display strap assembly.
Figure 5:
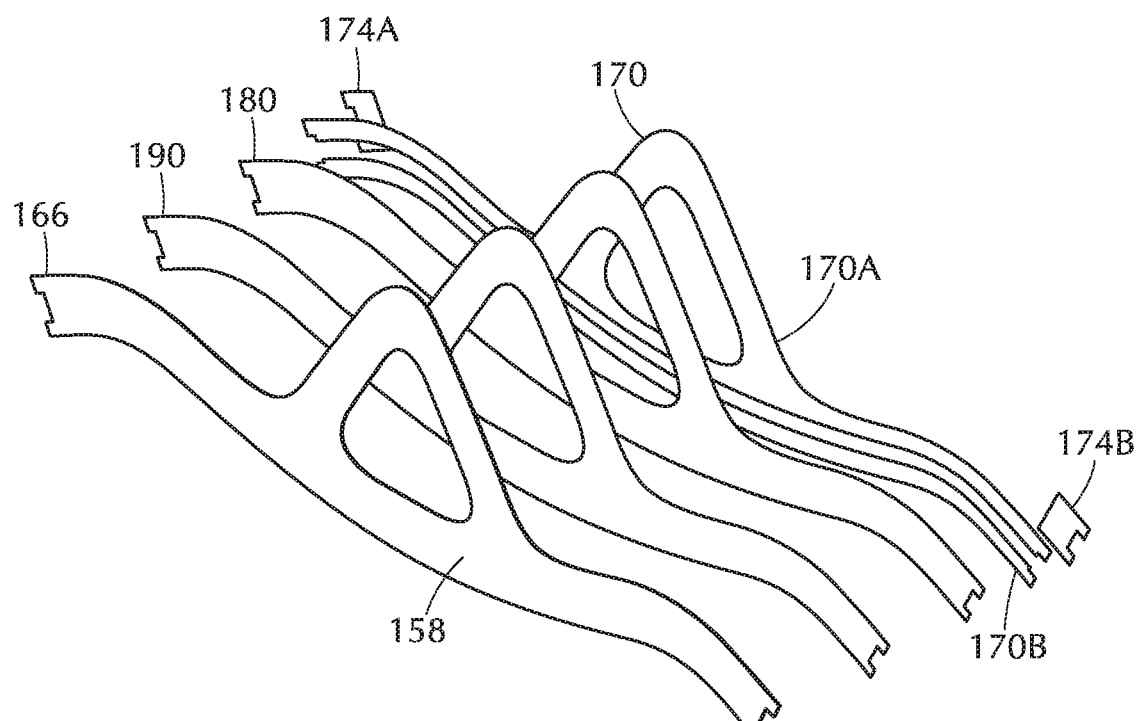
FIG. 5 is a perspective view of separated components of an exemplary flexible lining member for a head-mounted-display strap assembly.

FIGS. 3 and 4 respectively show front and back side views of an exemplary flexible lining member 150. FIG. 5 shows a perspective view of separated layers forming flexible lining member 150. Flexible lining member 150 is illustrated in a generally flattened condition in the figures. Flexible lining member 150 may include a plurality of layers that that are attached to each other in an overlapped configuration. In some embodiments, flexible lining member 150 may include a head-contact layer 166 forming head-contact surface 158, which is configured to directly abut back and/or side portions of a user's head while the user is wearing head-mounted-display system 100. Head-contact layer 166 may include any suitable material (polymer, leather, cloth, woven, etc.) that comfortably contacts and/or cushions the portion back and/or side portions of the user's head. In one example, head-contact layer 166 may include a relatively soft fabric material, such as a polymeric microfiber fabric (e.g., polyester micro-suede, ULTRASUEDE, etc.).

As shown in FIGS. 4 and 5, flexible lining member 150 may include a mounting layer 170 forming mounting surface 156 and defining wiring channel 162. Mounting layer 170 may include an upper mounting layer section 170A surrounding at least a portion of opening 160 and extending along an upper region of strap portion 154A and strap portion 154B and a lower mounting layer section 170B extending along a lower region of strap portion 154A, cradle portion 152, and strap portion 154B. Wiring channel 162 may be defined by upper mounting layer section 170A and lower mounting layer section 170B. Wiring channel 162 may have any suitable width or widths between upper mounting layer section 170A and lower mounting layer section 170B. In some embodiments, a surface of upper mounting layer section 170A defining wiring channel 162 may be generally or substantially parallel to a surface of lower mounting layer section 170B defining wiring channel 162. Mounting layer 170 may include a material suitable for abutting at least a portion of backing member 120, such as mounting surface 130 of backing member 120, upper mounting rim 132A, lower mounting rim 132B, and/or inner mounting rim 132C shown in FIG. 2. In some embodiments, mounting layer 170 may be directly and/or indirectly adhered to at least a portion of backing member 120 in strap assembly 110. Mounting layer 170 may, for example, include any suitable adhesive material for bonding to at least a portion of backing member 120, as will be discussed in greater detail below.

In at least one embodiment, mounting layer 170 may include a thermoplastic and/or thermosetting polymer material (e.g., a hot melt adhesive) that softens and becomes pliable tacky, or flowable when heated above a specified temperature (e.g., glass transition temperature, melting point, or softening point) and forms a bond with an adjacent surface when, for example, the material is subsequently cooled below the specified temperature. Examples of suitable thermoplastic and/or thermosetting polymer materials may include, without limitation, polyurethanes (e.g., ester-based polyurethanes, thermoplastic polyurethanes, reactive polyurethanes, etc.), ethylene-vinyl acetate copolymers, styrene-isoprene-styrene, polyolefins, ethylene-acrylate copolymers, styrene block copolymers (e.g., styrene-butadiene-styrene, styrene-isoprene-styrene, styrene-ethylene/butylene-styrene, styrene-ethylene-propylene, etc.), polycarbonates, silicone rubbers, thermoplastic elastomers (e.g., thermoplastic rubbers), polyamides, polyesters, vinyl esters, polyolefins (e.g., atactic polypropylene, polybutene-1, polyethylene, amorphous polyolefin, oxidized polyethylene, et ethylene-acrylate copolymers, fluoropolymers, polypyrrole polymers, acrylic resins, epoxies, phenolic resins, furan resins, and/or amino resins. Thermoplastic and/or thermosetting polymer materials may also include one or more additives, including, for example, tackifiers, plasticizers, waxes, and/or stabilizers, without limitation.

The specified temperature, above which a thermoplastic and/or thermosetting material softens and becomes pliable, tacky, or flowable, may include any suitable temperature above a standard normal temperature of 20° C. (68° F.), without limitation. For example, a specified temperature (e.g., glass transition temperature, melting point, or softening point) for one or more of the disclosed thermoplastic and/or thermosetting materials may be in a range from approximately 50° C. to approximately 500° C. (e.g., approximately 50° C. to approximately 60° C., approximately 60° C. to approximately 70° C., approximately 70° C. to approximately 80° C., approximately 80° C. to approximately 90° C., approximately 90° C. to approximately 100° C., approximately 100° C. to approximately 110 approximately 110° C. to approximately 120° C., approximately 120° C. to approximately 130° C., approximately 130° C. to approximately 140° C., approximately 140° C. to approximately 150° C., approximately 150° C. to approximately 160° C., approximately 160° C. to approximately 170° C., approximately 170° C. to approximately 180° C., approximately 190° C. to approximately 200 approximately 200° C. to approximately 210° C., approximately 210° C. to approximately 220° C., approximately 220° C. to approximately 230° C., approximately 230° C. to approximately 240° C., approximately 240° C. to approximately 250° C., approximately 250° C. to approximately 300° C., approximately 300° C. to approximately 350° C., approximately 350° C. to approximately 400 approximately 400° C. to approximately 450° C., approximately 450° C. to approximately 500° C., approximately 500° C. to approximately 550° C., and/or approximately 550° C. to approximately 600° C.). In some embodiments, a thermoplastic and/or thermosetting material may be heated at and/or to a temperature within a predetermined range of temperatures. For example, a thermoplastic ester-based polyurethane material having a softening point of approximately 75° C. may be heated at a temperature in a range of between approximately 80° C. and approximately 120° C.

In some embodiments, a thermoplastic and/or thermosetting material may be subjected to increased pressure during heating to improve bonding of the material to an adjacent surface. For example, a thermoplastic and/or thermosetting material may be subjected to a pressure within a predetermined range of pressures above a standard normal pressure of 1 atm (14.696 psi, 101.325 kPa). For example, one or more of the disclosed thermoplastic and/or thermosetting materials may subjected, during heating, to an elevated pressure in a range from approximately 20 PSI to approximately 200 PSI (e.g., approximately 20 PSI to approximately 30 PSI, approximately 30 PSI to approximately 40 PSI, approximately 40 PSI to approximately 50 PSI, approximately 50 PSI to approximately 60 PSI, approximately 60 PSI to approximately 70 PSI, approximately 70 PSI to approximately 80 PSI, approximately 80 PSI to approximately 90 PSI, approximately 90 PSI to approximately 100 PSI, approximately 100 PSI to approximately 150 PSI, and/or approximately 150 PSI to approximately 200 PSI). In some embodiments, a thermoplastic and/or thermosetting material may be subjected to a pressure within a predetermined range of pressures during heating. For example, a thermoplastic ester-based polyurethane material may be subjected to a pressure in a range of between approximately 40 PSI and approximately 60 PSI. Additionally or alternatively, a thermoplastic and/or thermosetting material may be heated without application of an elevated pressure.

According to at least one embodiment, mounting layer 170 may include a solid or semi-solid film at a temperature below the specified temperature, enabling mounting layer to be cut (e.g., die cut) to a desired shape prior to forming flexible lining member 150. For example, mounting layer 170 may include a film, such as a mono-layer film or multilayer film, that is coated on a release layer, such as a silicone release layer, prior to cutting and/or heating. In such an example, mounting layer 170 may be cut and placed adjacent to another layer (e.g., a mesh layer 180) prior to heating mounting layer 170. Additionally or alternatively, a material for forming mounting layer 170 may be heated and applied and/or bonded to at least another layer of flexible lining member 150 in a pliable, tacky, and/or flowable state.

In some embodiments, flexible lining member 150 may include at least one adhesive transfer element (e.g., adhesive transfer tape) adhered to a portion of mounting surface 156. For example, flexible lining member 150 may include adhesive transfer elements 174A and 174B, each having an adhesive layer, such as a pressure sensitive adhesive layer, disposed on at least a portion of mounting surface 156. As shown in FIG. 4, for example, adhesive transfer element 174A and adhesive transfer element 174B may be respectively adhered to surface regions of strap portion 154A and strap portion 154B adjacent to end notch 164A and end notch 164B. Adhesive transfer elements 174A and 174B may cover portions of wiring channel 162 respectively adjacent to end notch 164A and end notch 164B and may facilitate positioning and/or securement of electronic cable 140 during assembly of strap assembly 110. For example, cable main portion 142 of electronic cable 140 shown in FIG. 2 may be disposed within wiring channel 162 and portions of electronic cable 140 respectively adjacent to cable ends 144A and 144B may be secured to exposed adhesive layers of adhesive transfer elements 174A and 174B, thereby securing electronic cable 140 to flexible lining member 150 within wiring channel 162.

Flexible lining member 150 may also include a mesh layer 180 disposed between head-contact layer 166 and mounting layer 170. Mesh layer 180 may include any suitable mesh fabric having a series of connected (e.g., woven, knitted, attached, etc.) strands of one or more materials defining numerous closely spaced holes between the strands. In some embodiments, mesh layer may include fibers of one or more polymeric materials that are woven, knitted, extruded, oriented, and/or expanded. Examples of suitable polymeric materials included in mesh layer 180 may include, without limitation, polyester, polypropylene, nylon, polyethylene, polyvinyl chloride, and/or polytetrafluoroethylene. In some embodiments, mesh layer 180 may include a material, such as polyester, that is flexible yet relatively resistant to stretching. Accordingly, mesh layer 180, when bonded to adjacent layers of flexible lining member 150, may prevent deformation (e.g., formation of depressions overlapping wiring channel 162) of portions of flexible lining member 150 while increasing the strength and durability of flexible lining member 150. Mesh layer 180 may also be relatively thin so as to maintain a minimal profile for flexible lining member 150. Additionally, mesh layer 180 may be relatively flexible, enabling flexible lining member to easily conform to backing member 120 and to back and/or side portions of a user's head.

Mesh layer 180 may include any suitable thickness, hole size, and/or fiber size. Additionally, mesh layer 180 may be any suitable size and/or shape. For example, mesh layer 180 may have a peripheral shape that is substantially the same as mounting layer 170 such that the periphery of mesh layer 180 is substantially congruent with at least a peripheral edge portion of mounting layer 170 when mesh layer 180 is disposed between head-contact layer 166 and mounting layer 170. In at least one embodiment, mesh layer 180 may have a smaller outer peripheral shape than mounting layer 170. An inner edge of mesh layer 180 may also define an opening (see opening 186 in FIG. 6) that is larger than an opening 160 defined by an inner edge of mounting layer 170. In this example, peripheral and/or inner edge portions of mesh layer 180 may be disposed away from peripheral and/or inner edge portions of mounting layer 170 when mesh layer 180 is disposed between head-contact layer 166 and mounting layer 170. Accordingly, at least a peripheral and/or inner edge portion of mesh layer 180 may be inwardly offset from at least a peripheral and/or inner edge portion of mounting layer 170, as shown in FIG. 4.

Mesh layer 180 may be directly or indirectly adhered to mounting layer 170 and/or head-contact layer 166. In some embodiments, mounting layer 170 may be directly bonded to mesh layer 180. For example, mounting layer 170 may be heated above a specified temperature sufficient to bond mounting layer 170 to a back surface 182 of mesh layer 180. Back surface 182 may be a surface of mesh layer 180 that faces away from a head of a user wearing head-mounted-display system 100. At least a portion of mounting layer 170 may be bonded to back surface 182 of mesh layer 180 and/or may be disposed within hole portions of mesh layer 180. In at least one embodiment, mounting layer 170 may be bonded to mesh layer 180 prior to attaching flexible lining member 150 to backing member 120 shown in FIG. 2.

As shown in FIG. 4, a portion of mesh layer 180 may overlap wiring channel 162. In some embodiments, the portion of mesh layer 180 overlapping wiring channel 162 may directly abut wiring channel 162. For example, a portion of back surface 182 of mesh layer 180 may directly abut and cover at least a portion of wiring channel 162 such that back surface 182 of mesh layer 180 defines a user-side (i.e., a side positioned to be closest to a user wearing head-mounted-display system 100) portion of wiring channel 162. For example, when mounting layer 170 is heated to bond mounting layer 170 to mesh layer 180, a portion of mounting layer 170 may be displaced into wiring channel 162 so as to coat at least a portion of mesh layer 180 overlapping wiring channel 162. Additionally or alternatively, at least a portion of mesh layer 180 overlapping wiring channel 162 may be covered by a portion of mounting layer 170. For example, wiring channel 160 may not extend entirely through mounting layer 170 in a thickness direction of mounting layer 170.

In some embodiments, mesh layer 180 may be adhered to head-contact layer 166. For example, at least one adhesive material may bond mesh layer 180 to head-contact layer 166. In at least one embodiment, flexible lining member 150 may include a bonding layer 190 disposed between mesh layer 180 and head-contact layer 166, as shown in FIG. 5. Bonding layer 190 may include a material suitable for adhering at least a portion of head-contact layer 166 to mesh layer 180. Bonding layer 190 may, for example, include any suitable adhesive material for bonding to at least a portion of head-contact layer 166 and/or mesh layer 180. In some embodiments, bonding layer 190 may include a thermoplastic and/or thermosetting polymer material (e.g., a hot melt adhesive) that becomes pliable, tacky, and/or flowable when heated above a specified temperature and forms a bond with an adjacent surface when subsequently cooled below the specified temperature. Examples of suitable thermoplastic and/or thermosetting polymer materials may include any of the thermoplastic and/or thermosetting polymer materials and/or additives discussed above in relation to mounting layer 170, without limitation.

According to at least one embodiment, bonding layer 190 may include a solid or semi-solid film at a temperature below the specified temperature, enabling mounting layer to be cut (e.g., die cut) to a desired shape prior to forming flexible lining member 150. For example, bonding layer 190 may include a film, such as a mono-layer film or multi-layer film, that is coated on a release layer, such as a silicone release layer, prior to cutting and/or heating. In such an example, bonding layer 190 may be cut and placed adjacent to mesh layer 180 and/or head-contact layer 166 prior to heating bonding layer 190. In some embodiments, bonding layer 190 may be placed adjacent to mesh layer 180 and bonding layer 190 and mesh layer 180 may be cut at the same time (e.g., by die-cutting). In one example, bonding layer 190 may be bonded to mesh layer 180 prior to cutting bonding layer 190 and mesh layer 180. Additionally or alternatively, a material for forming bonding layer 190 may be heated and applied and/or bonded to mesh layer 180 and/or head-contact layer 166 in a pliable, tacky, and/or flowable state. At least a portion of bonding layer 190 may be bonded to a back surface (i.e., a surface facing opposite head-contact surface 158) of head-contact layer 166. Additionally, at least a portion of bonding layer 190 may be bonded to a front surface 189 (see FIG. 6) of mesh layer 180 facing opposite back surface 182 and/or may be disposed within hole portions of mesh layer 180. Front surface 189 may be a surface that faces toward a head of a user wearing head-mounted-display system 100.

Bonding layer 190 may be any suitable size, shape, and/or thickness. For example, bonding layer 190 may have a peripheral shape that is substantially the same as head-contact layer 166 and/or mesh layer 180 such that the periphery of bonding layer 190 is substantially congruent with at least a peripheral edge portion of head-contact layer 166 and/or mesh layer 180 when bonding layer 190 is disposed between head-contact layer 166 and mesh layer 180. In one embodiment, bonding layer 190 and mesh layer 180 may have a peripheral shape that is different than head-contact layer 166. For example, bonding layer 190 and mesh layer 180 may have a smaller peripheral shape than head-contact layer 166 (see, e.g., the smaller peripheral shape of mesh layer 180 relative to mounting layer 170 and head-contact layer 166 as illustrated in FIG. 4). An inner edge of bonding layer 190 and mesh layer 180 may also define an opening (see opening 186 in FIG. 6) that is larger than opening 160 defined by an inner edge of head-contact layer 166 (see, e.g., FIG. 4). In this example, peripheral and/or inner edge portions of bonding layer 190 and mesh layer 180 may be disposed away from peripheral and/or inner edge portions of head-contact layer 166 when bonding layer 190 and mesh layer 180 are disposed between head-contact layer 166 and mounting layer 170. Accordingly, at least a peripheral and/or inner edge portion of each of bonding layer 190 and mesh layer 180 may be inwardly offset from at least a peripheral and/or inner edge portion of head-contact layer 166.

In some embodiments, a peripheral and/or an inner edge portion of head-contact layer 166 may not overlap at least a portion of bonding layer 190 and mesh layer 180 and may contact and/or be directly bonded to a peripheral and/or an inner edge portion of mounting layer 170. Accordingly, at least a peripheral and/or an inner edge portion of bonding layer 190 and mesh layer 180 may be covered and/or surrounded by mounting layer 170 and/or head-contact layer 166 so as to not be exposed. Such a configuration may facilitate secure bonding of the various layers of flexible lining member 150 while preventing portions of mesh layer 180 from being exposed, thereby preventing damage (e.g., edge fraying, wear, etc.) to exposed portions of mesh layer 180.

Figure 6:
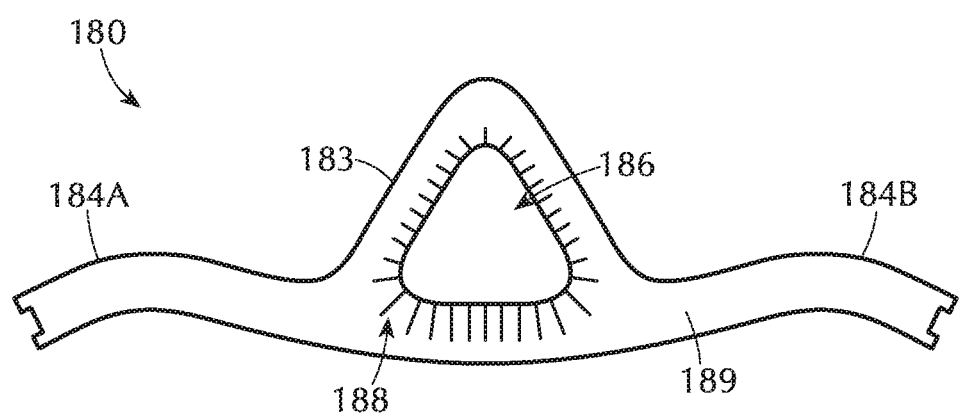
FIG. 6 is a front side view of an exemplary mesh layer of a fabric assembly for a head-mounted-display strap assembly.

FIG. 6 shows a front side view of mesh layer 180 according to some embodiments. Mesh layer 180 may be cut and/or formed to any suitable size, shape, and/or thickness. In some embodiments, mesh layer 180 may be cut (e.g., die cut) from a larger piece of mesh material. As shown in FIG. 6, mesh layer 180 may include a cradle portion 183 and strap portions 184A and 184B respectively forming part of cradle portion 152 and strap portions 154A and 154B of flexible lining member 150 shown in FIGS. 3 and 4. Cradle portion 183 of mesh layer 180 may define an opening 186 corresponding to and/or surrounding opening 160 of flexible lining member 150 shown in FIGS. 3 and 4. In some embodiments, a peripheral shape of mesh layer 180 may be smaller than a peripheral shape of flexible lining member 150 as illustrated, for example, in FIG. 4. Additionally or alternatively, opening 186 defined by mesh layer 180 may be larger than opening 160 defined by flexible lining member 150. In one embodiment, mesh layer 180 may have a peripheral shape and/or may define an opening 186 that are substantially the same as a peripheral shape of flexible lining member 150 and/or opening 160 defined by flexible lining member 150, respectively.

Mesh layer 180 may provide one or more advantages as part of flexible lining member 150. For example, mesh layer 180 may structurally strengthen flexible lining member 150 while maintaining the flexibility of flexible lining member 150. In some examples, mesh layer 180 may bridge wiring channel 162 so as to strengthen a thinner portion of flexible lining member 150 overlapping wiring channel 162 and prevent formation of a visible depression on a side of flexible lining member 150, such as head-contact surface 158, facing a user. Holes in mesh layer 180 may enable mesh layer 180 to compress as needed when flexible lining member 150 and/or strap assembly 110 is bent compressed, and/or otherwise deformed. For example, some regions of mesh layer 180 may independently compress and/or deform with respect to other regions mesh layer 180.

Holes defined in mesh layer 180 may also facilitate bonding of mesh layer 180 to adjacent layers while adding little or no thickness to flexible lining member 150. For example, adhesive materials (e.g., hot-melt adhesive) from mounting layer 170 and/or bonding layer 190 may flow into and/or infiltrate holes in mesh layer 180 during bonding to more securely bond mesh layer 180 to mounting layer 170 and/or bonding layer 190. In some embodiments, portions of mounting layer 170 and bonding layer 190 may be bonded directly to each other via holes defined in mesh layer 180. Elevated heat and/or pressure may facilitate infiltration of an adhesive material into the holes in mesh layer 180 during bonding. Because holes in mesh layer 180 may be impregnated with portions of mounting layer 170 and/or bonding layer 190, mesh layer 180 may essentially become part of mounting layer 170 and/or bonding layer 190 such that mesh layer does not define a distinct layer adding noticeably to the thickness of flexible lining member 150 following bonding. Delamination of mesh layer 180 from adjacent layers may also be prevented due to a secure bond provided by infiltration of the bonding materials from adjacent mounting layer 170 and/or bonding layer 190 within holes in mesh layer 180.

In some embodiments, one or more slits 188 may be defined in mesh layer 180. For example, as shown in FIG. 6, a plurality of slits 188 may be defined in mesh layer 180 surrounding opening 186. Slits 188 may additionally or alternatively be defined in any other suitable portion of mesh layer 180 and/or one or more portions of bonding layer 190, mounting layer 170, and/or head-contact layer 166, without limitation. In at least one embodiment, one or more of slits 188 may be defined by cutting portions of mesh layer 180 such that slits 188 intersect and extend from opening 186. For example, various slits 188 may extend to one or more lengths from opening 186. While relatively linear slits 188 are illustrated in FIG. 6, slits 188 may be any suitable shape and/or size, without limitation. Slits 188 may extend through mesh layer 180 in a thickness direction from back surface 182 shown in FIG. 4 to a front surface 189 of mesh layer 180 in a thickness direction. In at least one embodiment, one or more of slits 188 may extend through only a portion of mesh layer 180 so as not intersect a periphery of mesh layer 180. In some embodiments, one or more slits may also be defined in a portion of bonding layer 190. For example, one or more slits corresponding to slits 188 defined in mesh layer 180 may be defined in adjacent bonding layer 190 such that the slits in bonding layer 190 at least partially overlap slits 188 in mesh layer 180.

Slits 188 may enable flexible lining member 150 to conform to contours (e.g., curved portions of mounting surface 130) of backing member 120 shown in FIG. 2, particularly contours around opening 134 defined in backing member 120. For example, cradle portion 152 of flexible lining member 150 shown in FIGS. 3 and 4 may include cradle portion 183 of mesh layer 180 defining slits 188. In some embodiments, while mesh layer 180 may be relatively resistant to stretching, and therefore resistant to conforming to certain contours as part of flexible lining member 150, slits 188 may allow for additional conformation of cradle portion 152 defining opening 160 in flexible lining member 150 by permitting displacement of adjacent portions of mesh layer 180 defining slits 188. Slits 188 may also facilitate comfortable and secure positioning of strap assembly 110 shown in FIG. 1 to a head portion of a user by enabling sufficient conformation of cradle portion 152 of strap assembly 110 to surface contours of the user's head.

Figure 7:
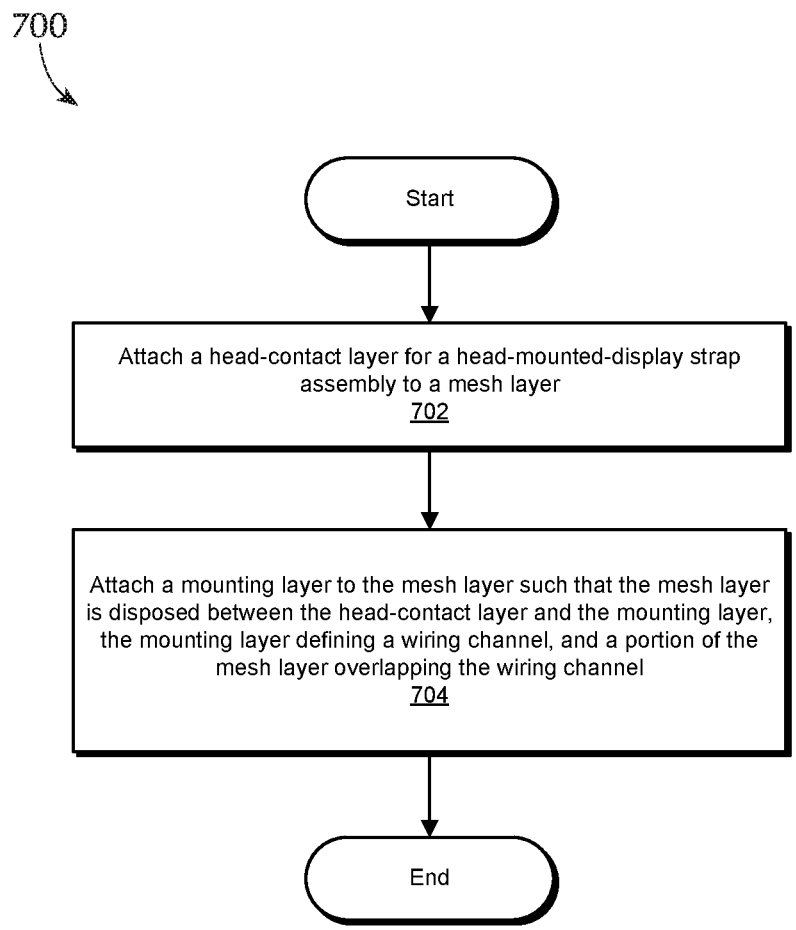
FIG. 7 is a flow diagram of an exemplary method for manufacturing a head-mounted-display strap assembly.

FIG. 7 is a flow diagram of an exemplary method 700 for manufacturing a strap assembly for a head-mounted-display system according to any of the embodiments disclosed herein. The steps shown in FIG. 7 may be performed by an individual and/or by any suitable manual and/or automated apparatus.

At step 702 in FIG. 7, a head-contact layer for a head-mounted-display strap assembly may be attached to a mesh layer. For example, head-contact layer 166 may be attached to mesh layer 180 (see, e.g., FIGS. 3-5).

Figure 8A:
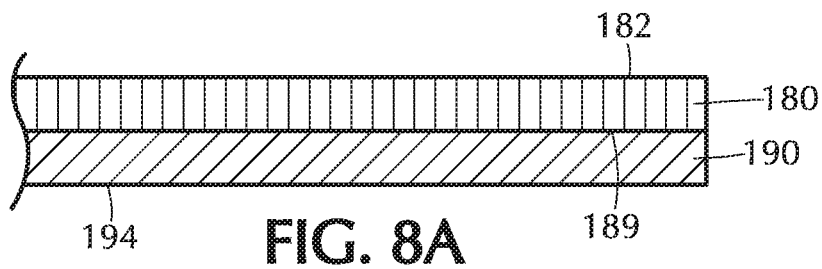
FIGS. 8A-8D are cross-sectional views showing portions of components of a head-mounted-display strap assembly at selected intervals during manufacturing.
Figure 8B:
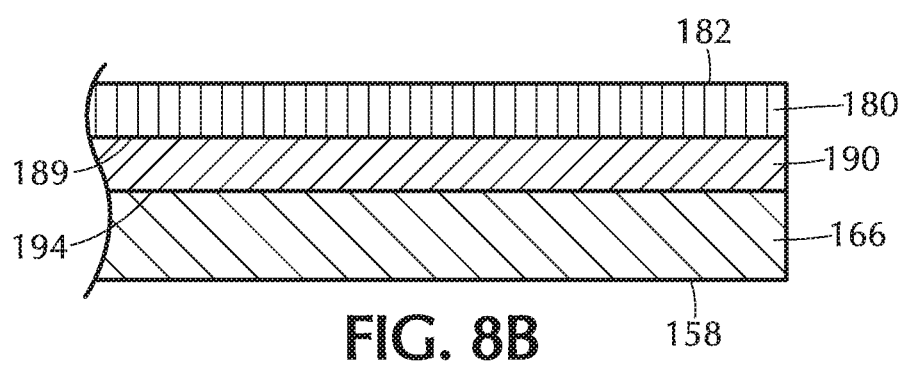

In some embodiments, attaching the head-contact layer to the mesh layer may include bonding the head-contact layer to the mesh layer by a bonding layer disposed between the head-contact layer and the mesh layer. For example, head-contact layer 166 may be bonded to mesh layer 180 by bonding layer 190 disposed between head-contact layer 166 and mesh layer 180 (see, e.g., FIG. 5). In at least one embodiment, bonding layer 190 may be bonded to one of head-contact layer 166 or mesh layer 180 prior to adhering bonding layer 190 to the other of head-contact layer 166 or mesh layer 180. Bonding layer 190 may be bonded to head-contact layer 166 and/or mesh layer 180 in any suitable manner FIGS. 8A-8D are cross-sectional views illustrating portions of components of a strap assembly at selected intervals during a manufacturing process. In at least one embodiment, as shown in FIGS. 8A and 8B, head-contact layer 166 may be attached to mesh layer 180 via bonding layer 190. For example, as shown in FIG. 8A bonding layer 190 may be initially bonded to mesh layer 180.

In some embodiments, as described above, bonding layer 190 may include a thermoplastic and/or thermosetting material, such as a thermoplastic and/or thermosetting polymer. Bonding layer 190 may be heated above a specified temperature, above which a material of bonding layer 190 becomes pliable, tacky, and/or flowable. In at least one embodiment, bonding layer 190 may be layered abutting a surface, such as front surface 189, of mesh layer 180. Bonding layer 190 and mesh layer 180 may then be heated above the specified temperature for a selected period of time and subsequently cooled to bond mesh layer 180 to bonding layer 190. In some examples, bonding layer 190 and mesh layer 180 may be subjected to an elevated pressure during heating. In one embodiment, bonding layer 190 may include a thermoplastic ester-based polyurethane material that is heated at a temperature in a range of between approximately 80° C. and approximately 120° C. and subjected to a pressure in a range of between approximately 40 PSI and approximately 60 PSI for a time period of between approximately 10 seconds to approximately 30 seconds.

Bonding layer 190 and/or mesh layer 180 may be cut and/or formed to a desired size and/or shape either prior to or following bonding of mesh layer 180 to bonding layer 190. In at least one embodiment, bonding layer 190 and mesh layer 180 may each be cut and/or formed from larger sheets that are bonded to each other as described above. Following bonding, at least a portion of the bonded sheets may be cut e.g., die cut) to a desired size and/or shape to form bonding layer 190 and mesh layer 180 shown in FIGS. 3-6. In some embodiments, slits, such as slits 188 shown in FIG. 6, may also be cut in mesh layer 180 and/or bonding layer 190. In one embodiment, slits corresponding to slits 188 may be cut in both bonding layer 190 and mesh layer 180 such that the slits extend through both layers in a thickness direction of bonding layer 190 and mesh layer 180

Subsequently as illustrated in FIG. 8B, head-contact layer 166 may be layered abutting a front surface 194 of bonding layer 190. In some embodiments, head-contact layer 166 may be cut and/or formed to a desired size and/or shape (such as that illustrated in FIGS. 3-5) prior to bonding head-contact layer 166 to bonding layer 190. Bonding layer 190, mesh layer 180, and head-contact layer 166 may then be heated above the specified temperature for a selected period of time and then subsequently cooled to bond head-contact layer 166 to bonding layer 190. In some examples, bonding layer 190, mesh layer 180, and head-contact layer 166 may be subjected to an elevated pressure during heating. For example, bonding layer 190, mesh layer 180, and head-contact layer 166 may be heated at a temperature in a range of between approximately 80° C. and approximately 120° C. and subjected to a pressure in a range of between approximately 40 PSI and approximately 60 PSI for a time period of between approximately 10 seconds to approximately 30 seconds.

Returning to method 700 of FIG. 7, at step 704, a mounting layer may be attached to the mesh layer such that the mesh layer is disposed between the head-contact layer and the mounting layer, the mounting layer defining a wiring channel, and a portion of the mesh layer overlapping the wiring channel. For example, mounting layer 170 may be attached to mesh layer 180 such that mesh layer 180 is disposed between head-contact layer 166 and mounting layer 170 (see, e.g., FIGS. 3-5). Mounting layer 170 may define wiring channel 162 and a portion of mesh layer 180 may overlap wiring channel 162 (see, e.g., FIGS. 2-5).

Figure 8C:
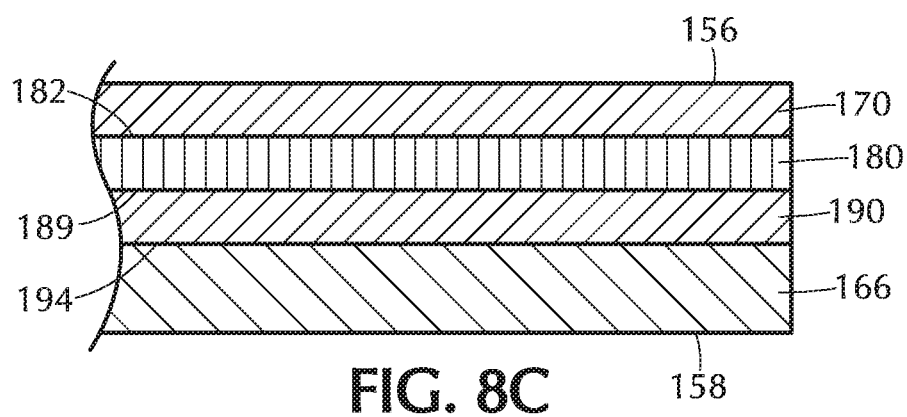

FIG. 8C shows, for example, a mounting layer 170 attached to mesh layer 180. In one embodiment, mounting layer 170 may be attached to mesh layer 180 following bonding of bonding layer 190 to head-contact layer 166 and mesh layer 180, as described above in reference to FIGS. 8A and 8B.

In some embodiments, as described above, mounting layer 170 may include a thermoplastic and/or thermosetting material, such as a thermoplastic and/or thermosetting polymer. In at least one embodiment, mounting layer 170 may be layered abutting a surface, such as front surface 189, of mesh layer 180. Mounting layer 170 may then be heated above a specified temperature for a selected period of time and subsequently cooled to bond mounting layer 170 to mesh layer 180. In some examples, mounting layer 170 and mesh layer 180 may be subjected to an elevated pressure during heating. In one embodiment, mounting layer 170 may include a thermoplastic ester-based polyurethane material that is heated at a temperature in a range of between approximately 80° C. and approximately 120° C. and subjected to a pressure in a range of between approximately 40 PSI and approximately 60 PSI for time period of between approximately 10 seconds to approximately 30 seconds.

In at least one embodiment, mounting layer 170 may be cut and/or formed to a desired size and/or shape (such as that illustrated in FIGS. 3-6) prior to bonding mounting layer 170 to mesh layer 180. For example mounting layer 170 may but cut (e.g., die cut) to include upper mounting layer section 170A and lower mounting layer section 170B defining wiring channel 162 therebetween, as shown in FIG. 4. In some embodiments, after mounting layer 170 is adhered to mesh layer 180, at least a portion of an electronic cable, such as electronic cable 140 shown in FIG. 2, may be disposed within wiring channel 162.

Figure 8D:
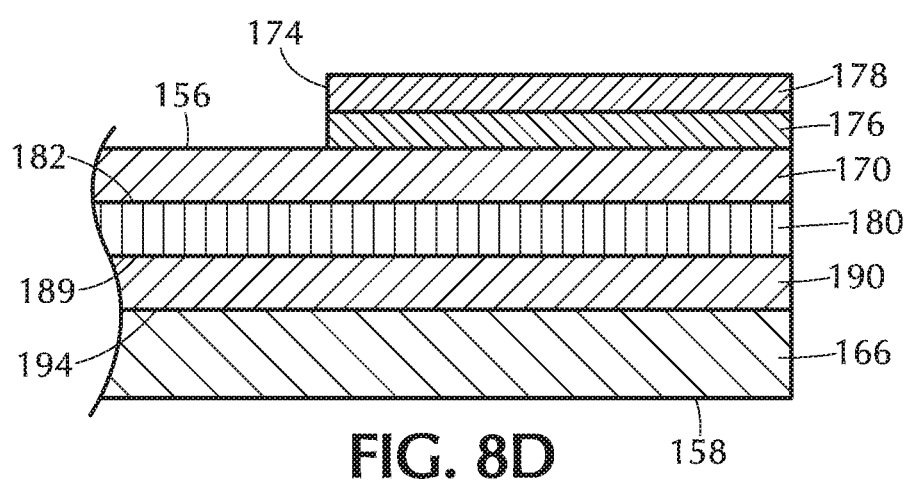

According to one embodiment, as shown in FIG. 8D, an adhesive transfer element 174 (e.g., adhesive transfer tape) may be attached to a portion of mounting layer 170 (see, e.g., adhesive transfer elements 174A and 174B illustrated in FIGS. 4 and 5). For example, adhesive transfer element 174 may be adhered to at least a portion of mounting surface 156 of mounting layer 170 so as to overlap end portions of wiring channel 162. Mounting layer 174 may include an adhesive layer 176, which contacts mounting layer 170, and a liner layer 178 overlapping adhesive layer 176. In some embodiments, adhesive transfer element 174 may be cut and/or formed to a desired size and/or shape (e.g., by die cutting) prior to attaching adhesive transfer element 174 to mounting layer 170. Adhesive transfer element 174 may be adhered to mounting layer 170 prior to disposing electronic cable 140 in wiring channel 162.

In at least one embodiment, after head-contact layer 166, bonding layer 190, mesh layer 180, mounting layer 170, and adhesive transfer elements 174, are assembled and bonded together to manufacture flexible lining member 150, each of these layers of flexible lining member 150 may be further cut and/or formed. For example, a periphery of flexible lining member 150 may be die cut following assembly to ensure the exposed layers of flexible lining member 150 have a substantially congruent periphery and/or inner edge or surface defining opening 160 in flexible lining member 150, as shown in FIG. 4.

Mounting layer 170 of flexible lining member 150 may be attached to backing member 120 (see, e.g., FIG. 2) such that at least a portion of electronic cable 140 is positioned between mesh layer 180 of flexible lining member 150 and backing member 120. For example, flexible lining member 150 may be disposed within mounting recess 126 defined within backing member 120 so that mounting layer 170 of flexible lining member 150 abuts mounting surface 130 of backing member 120. In some embodiments, flexible lining member 150 and/or backing member 120 may be heated above the specified temperature for a selected period of time and subsequently cooled to bond mounting layer 170 of flexible lining member 150 to mounting surface 130 of backing member 120. In some examples, flexible lining member 150 and/or backing member 120 may be subjected to an elevated pressure during heating.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed to manufacture strap assembly 110. The various exemplary methods described and/or illustrated herein may also omit one or more of the steps described or illustrated herein or include additional steps in addition to those disclosed.

As discussed throughout the instant disclosure, the disclosed methods, systems, and devices may provide one or more advantages over traditional headset strap assemblies. For example, the strap assemblies described herein may include a flexible lining member that structurally strengthens the strap assemblies relative to other types of strap assemblies while providing flexibility to comfortably and securely mount headsets to users' heads. Furthermore, the flexible lining members of the disclosed strap assemblies may be minimized in overall thickness to decrease the weight and profile of the strap assembly strap. Additionally, in contrast to other types of strap assemblies, the flexible lining members of the strap assemblies discussed herein may include an inner wiring channel that accommodates an electronic cable while preventing formation of an aesthetically unpleasing visible depression on a side of the strap assemblies facing the user. In general, the assemblies and systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

Where a range of values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display strap assembly comprising:
   a flexible lining member comprising:
      a head-contact layer positioned to abut a head portion of a user;
      a mounting layer positioned to be mounted to a backing member, the mounting layer overlapping the head-contact layer and defining a wiring channel; and
      a mesh layer disposed between the head-contact layer and the mounting layer such that a portion of the mesh layer overlaps the wiring channel, the mesh layer comprising a mesh fabric including a plurality of interconnected fibers, wherein the mounting layer comprises a thermoplastic polymer attaching the mounting layer to the mesh layer.

2. The head-mounted-display strap assembly of claim 1, further comprising an electronic cable at least partially disposed within the wiring channel defined by the mounting layer.

3. The head-mounted-display strap assembly of claim 2, further comprising the backing member comprising a mounting surface, wherein:
   the mounting layer of the flexible lining member is disposed adjacent to the mounting surface of the backing member; and
   at least a portion of the electronic cable is positioned between the mesh layer and the backing member.

4. The head-mounted-display strap assembly of claim 3, wherein the mounting layer of the flexible lining member is attached to the mounting surface of the backing member.

5. The head-mounted-display strap assembly of claim 3, wherein:
a mounting recess is defined within the backing member, a portion of the mounting recess being defined by the mounting surface; and
at least a portion of the flexible lining member is disposed within the mounting recess.

6. The head-mounted-display strap assembly of claim 1, wherein the thermoplastic polymer is bonded to the mesh layer.

7. The head-mounted-display strap assembly of claim 1, wherein at least a portion of the thermoplastic polymer is disposed within a plurality of holes defined in the mesh layer.

8. The head-mounted-display strap assembly of claim 1, wherein the mesh layer comprises a polymeric mesh fabric.

9. The head-mounted-display strap assembly of claim 1, wherein the flexible lining member defines an opening extending through the head-contact layer, the mounting layer, and the mesh layer.

10. The head-mounted-display strap assembly of claim 9, wherein the mesh layer defines a plurality of slits surrounding the opening.

11. A head-mounted-display system comprising:
a head-mounted display; and
a strap assembly coupled to the head-mounted display, the strap assembly comprising:
a backing member;
a flexible lining member mounted to the backing member, the flexible lining member comprising:
a head-contact layer positioned to abut a head portion of a user;
a mounting layer overlapping the head-contact layer, the mounting layer abutting the backing member and defining a wiring channel; and
a mesh layer disposed between the head-contact layer and the mounting layer such that a portion of the mesh layer overlaps the wiring channel, the mesh layer comprising a mesh fabric including a plurality of interconnected fibers, wherein the mounting layer comprises a thermoplastic polymer attaching the mounting layer to the mesh layer; and
an electronic cable at least partially disposed within the wiring channel defined by the mounting layer such that at least a portion of the electronic cable is positioned between the mesh layer and the backing member.

12. The head-mounted-display system of claim 11, wherein the strap assembly comprises a back piece defining an opening extending through the backing member and the flexible lining member.

13. The head-mounted-display system of claim 11, wherein the thermoplastic polymer is bonded to the mesh layer and to a mounting surface of the backing member.

14. The head-mounted-display system of claim 11, wherein the mesh layer comprises a polymeric mesh fabric.

15. A method comprising:
attaching a head-contact layer for a head-mounted-display strap assembly to a mesh layer comprising a mesh fabric including a plurality of interconnected fibers; and
attaching a mounting layer to the mesh layer such that the mesh layer is disposed between the head-contact layer and the mounting layer, the mounting layer defining a wiring channel, and a portion of the mesh layer overlapping the wiring channel, wherein:
the head-contact layer is positioned to abut a head portion of a user;
the mounting layer is positioned to be mounted to a backing member; and
the mounting layer comprises a thermoplastic polymer attaching the mounting layer to the mesh layer.

16. The method of claim 15, wherein attaching the mounting layer to the mesh layer comprises heating the mounting layer to a temperature sufficient to bond the thermoplastic polymer to the mesh layer.

17. The method of claim 15, further comprising positioning at least a portion of an electronic cable within the wiring channel.

18. The method of claim 17, further comprising attaching the mounting layer to the backing member such that at least the portion of the electronic cable is positioned between the mesh layer and the backing member.

19. The method of claim 18, wherein attaching the mounting layer to the backing member comprises heating the mounting layer to a temperature sufficient to bond the thermoplastic polymer to a mounting surface of the backing member.

20. The method of claim 15, wherein attaching the head-contact layer to the mesh layer comprises bonding the head-contact layer to the mesh layer by a bonding layer disposed between the head-contact layer and the mesh layer.

* * * * *